Aug. 2, 1932.    R. J. MAMMES    1,869,819

METHOD OF FORMING COMPOSITE MOTION PICTURE FILMS

Filed Dec. 12, 1927

Inventor
Raymond J. Mammes.
By Lyon & Lyon
Attorneys

Patented Aug. 2, 1932

1,869,819

UNITED STATES PATENT OFFICE

RAYMOND J. MAMMES, OF LOS ANGELES, CALIFORNIA, ASSIGNOR TO METRO-GOLDWYN-MAYER CORPORATION, OF CULVER CITY, CALIFORNIA, A CORPORATION OF NEW YORK

METHOD OF FORMING COMPOSITE MOTION PICTURE FILMS

Application filed December 12, 1927. Serial No. 239,355.

This invention relates to a method of forming composite motion picture films, and is more particularly related to a method of uniting upon a single film a multiplicity of scenes taken upon separate films, the separate scenes being taken on negative films and printed onto a single positive film to unite the scenes on said positive film.

Different methods have heretofore been employed for the production of composite motion picture film employing what is known in the art as "trick photography" to unite the separate films on a single negative from which a positive print is then formed. One of such methods is particularly described and illustrated in the patent issued to Frank D. Williams, No. 1,589,731. Another method commonly employed in producing composite motion picture film is the so-called glass shot method in which part of the scene is painted or otherwise produced on a glass mirror or the like before which the acting scene may be taken. All of these methods depend upon exact matching of matts or the like in order that a substantially perfect motion picture film may be produced which, when projected upon a screen, will not show imperfections. The difficulty encountered in matching matts or the like in the production of such a composite motion picture film is that lines or the like are produced on the film which show when the film is projected upon a screen.

It is, therefore, an object of this invention to provide a method of producing composite motion picture films which includes the taking of the separate scenes on negative films and then printing these separate films on a single positive film.

Another object of this invention is to provide a method of producing or forming composite motion picture films including the taking of a multiplicity of separate scenes on separate negative films, printing the negative films onto a positive film, and painting in the spaces between the separate scenes on the positive film to match the same and produce a perfect, matched positive print from which the individual positive prints to be projected are formed.

Another object of this invention is to provide a method of forming composite motion picture films which includes the taking of a multiplicity of individual scenes and reducing said scenes in an enclosed housing, illuminating the scenes in said housing, and printing the reduced scenes in proper position on a single positive film.

Another object of this invention is to provide a method of forming composite motion picture films from a multiplicity of scenes taken separately on negative films by reducing said scenes and printing the same on a single positive film, the said negative films and positive film being run together through a printing machine in timed relation.

Another object of this invention is to provide a method of forming composite motion picture films which includes the taking of a multiplicity of separate scenes on separate negative films, printing the separate scenes on a separate positive film, and matching the light between the separate films to form a single print of uniform light intensity.

Other objects and advantages of this invention, it is believed, will be apparent from the following detailed description of a preferred embodiment thereof, as illustrated in the accompanying drawing.

In the drawing:

Figure 1 is a diagrammatic elevation of an apparatus employed in carrying out the method embodying this invention.

Figures 2, 3, and 4 illustrate negative films with separate scenes produced thereon.

Figure 6 is a view showing the completed positive film with the spaces between the scenes painted in.

In carrying out the method embodying this invention, a multiplicity of scenes of any desired or required number to form the finished composite motion picture film are taken separately and negatives 1, 2 and 3 thereof are developed. The negative 1 may include a scene of action taking place in a mountainous region, such for example, as illustrating a wagon train passing over a hill, the negative 2 may include a scene taken many miles removed from the scenes shown on the negatives 1 and 3 and providing merely a background to give to the finished film the effect of the entire film having been taken at some historic point or in some country foreign to the United States, while the negative 3 may include a close up scene of a number of actors or the like which may be taken on a set in the motion picture studio. The negatives so produced are developed.

Figure 1:
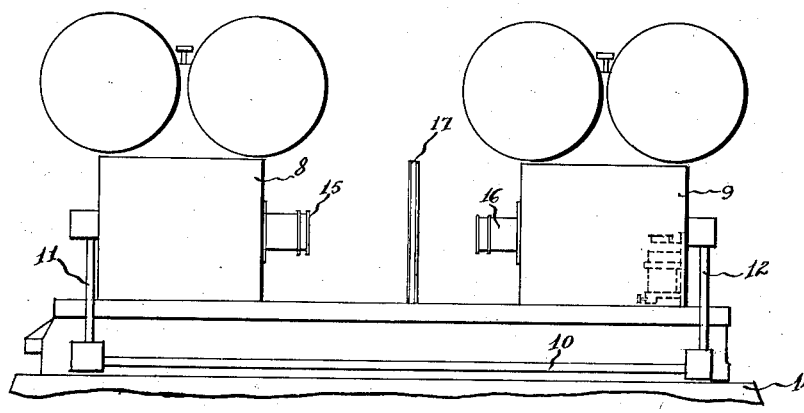
Figure 2:
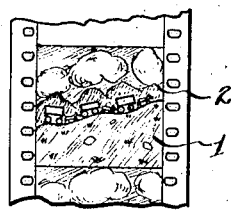
Figure 3:
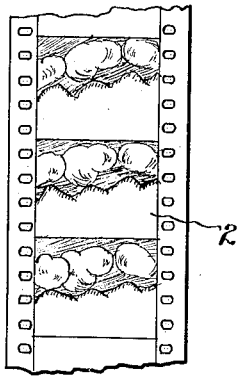
Figure 4:
Figure 5:
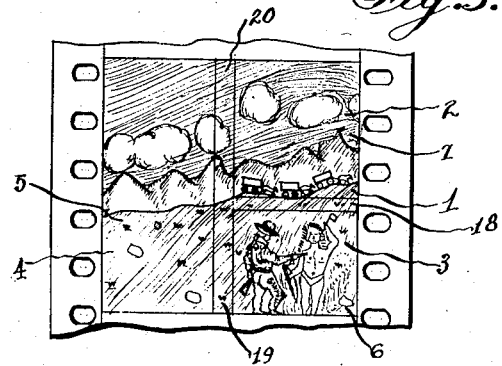
Figure 5 is an enlarged view showing one frame of the positive film on which the separate scenes have been printed.

The scenes of the individual negatives are then printed on a single positive 4 by reducing the scenes or pictures recorded on the negative films so that their exposures or images on the positive film 4 occupy substantially the positions 5, 6, and 7, as illustrated in Figure 5. The printing of the individual scenes of the positive film 4 is performed in an apparatus including a pair of cameras 8 and 9 which are connected to a common drive rod 10 which is connected through suitable connections 11 and 12 with winding mechanism for winding the film reels in the cameras 8 and 9. The drive rod 10 is driven from a suitable motor, or any other suitable device. The cameras 8 and 9 are mounted on a lathe bench 14 in a manner to permit the same to be adjusted in position to or from each other, and also in a manner to permit the lenses of the cameras, particularly the camera 9, to be focused in relation to the lens of the camera 8 to obtain the printing of the scene on the particular negative in the camera 9 on the correct position of the positive film being reeled in the camera 8. It is understood that by thus focusing camera 9 with relation to the lens of the camera 8, an aerial image is formed of the scene on the negative in the camera 9 in the front focal plane of the lens of the camera 8. If desired, in order to produce the required print of the scene on the positive film, any suitable or desirable form of matt may be interposed between the lenses 15 and 16 of the cameras 8 and 9, respectively. Any suitable form of matt such, for example, as is well understood in the art, may be employed for matting out any desired portion of the film being run in the camera 9 so as to exclude the printing of this portion of the film being run in the camera 9 from printing on the positive film 4 being exposed in the camera 8.

In order to match the films 1, 2, and 3 to produce an even exposure thereof on the positive film 4 so that the correct lighting will be had to match the printing of the scenes, the exposure in the camera 8 may be regulated at the lens 15 to correct the exposures had in the taking of the films 1, 2, and 3. This getting of the exposure of the film in the camera 8 may be obtained by adjustment of the lens 15 in a manner well understood in the art, so that applicant does not deem it necessary to particularly point out and describe the manner in which the light is matched other than to say that it is performed by cutting the exposure of the positive film in the camera 8 during the printing of the different scenes from the negative films 1, 2, and 3. If desired or required, in order to produce any particular result as to lighting or printing in the camera 8, a filter 17 of any suitable or desirable material may be interposed between the lenses of the cameras 8 and 9 during the printing of any particular scene on the positive film 4.

The scenes printed on the positive film from the negative films may be reduced in the printing of said scenes on the positive film by locating the positive print in the correct position relative to the negative film and properly adjusting the lenses 15 and 16 of the cameras 8 and 9, or by the use of suitable reducing means in order to reduce the image of the negative film in the camera 9. In order to effect the printing of the scene from the negative film to the positive film 4, a lamp or any other suitable lighting means is positioned in the camera 9 behind the film being reeled therein. By this means, there is no real projection of the scene from the negative film to the positive print but a mere exposure of the lighted film to print upon the exposed positive film being reeled in the camera 8 in timed relation with the reeling of the negative film in the camera 9. The reeling of the films in the cameras 8 and 9 by the drive produced from the drive shaft 10, and connections 11 and 12, also operates to actuate the shutters of the cameras 8 and 9 in timed relation. For example, if the images on negative 2 are to be first printed upon a positive, then the negative 2 is placed in camera 9, a suitable mat inserted in the camera 8 so as to protect one-half of the positive film in camera 8, and the cameras simultaneously operated, thus printing one-half of the image recorded on negative 2 upon one-half of the positive film in camera 9. No optical reduction or enlargement is used during this particular printing step of this example. If the negative 1 is next to be printed, then the partially printed positive in camera 8 is rewound, the negative 1 is placed in camera 9, and a mat placed in camera 8, said mat covering the previously printed or exposed half of the picture area as well as the lower section of the unexposed half of the positive film. The lenses of the camera are then so adjusted as to cause the image recorded on and carried by the negative 1 to be reduced to approximately one-half size, thus permitting substantially the entire image carried by and recorded on negative 1 to be optically printed onto the upper right corner section of the positive in the camera. After the cameras have again been simultaneously operated to carry out this second printing operation, then only the lower right corner of the positive has not been exposed or printed.

The image carried by negative 3 is then printed by optical reduction into this unexposed corner, a mat being employed during this operation which covers and protects all of the previously exposed portions of the positive. As a result, a positive is obtained which contains immages from negatives 1, 2 and 3, the images printed from negatives 2 and 3 being smaller in actual size than the size of such images on the negatives themselves. If the work is carefully done, very little if any subsequent matching between the images printed from the separate negatives to correlate the separate images and form a unitary composite scene therefrom, needs be done on the positive.

Figure 6:
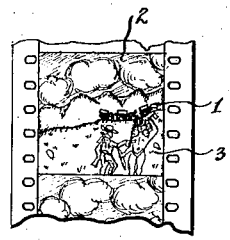

As a result of the hereinabove described operations, therefore, there is produced a positive such as is shown in Fig. 6, such positive being coextensive in picture area with the picture areas of the negatives, but including the images carried by the separate negatives certain of said images having been reduced in size.

After the scenes, for example, 1, 2, and 3 have been printed upon the positive film 4, with a space between the exposed portions of the positive film, the spaces 18, 19, and 20 between the said printed scenes are then filled in by painting on the positive print in a manner to match and correlate perfectly the scenes 1, 2, and 3, in order to produce the completed composite picture. The positive film so produced may be then used for printing other positive or negative films as desired.

Having fully described my invention, it is to be understood that I do not wish to be limited to the details herein set forth, but my invention is of the full scope of the appended claims.

I claim:

1. A method of producing motion picture films containing scenes composed of a plurality of different and separately recorded components, comprising photographically recording differing components on separate negative films, and developing such negative films, printing all components recorded on one of said negative films upon a portion of a positive film, protecting other portions of said positive film from exposure during such printing, then protecting the exposed portion of the positive film as well as a part of the remaining unexposed portion of said positive, printing all components carried by another of said negative films upon the unprotected, unexposed portion of the positive film, optically reducing the components carried by said last named negative film during such printing operation, then protecting the exposed portions of said positive film and printing into the unexposed portion of said positive film the components carried by another negative film, so as to form a single composite scene on the positive film which includes components recorded on all of said negatives.

2. A method of producing motion picture films containing scenes composed of a plurality of different and separately recorded components, comprising photographically recording differing components on separate negative films and developing such negative films, printing components recorded on one of said negative films upon a portion of a positive film, protecting other portions of said positive film from exposure during such printing, then protecting the exposed portion of the positive film as well as a part of the remaining unexposed portion of said positive, printing all components carried by another of said negative films upon the unprotected unexposed portion of the positive film, optically reducing the components carried by said last named negative film during such printing operation, then protecting the exposed portions of said positive film and printing into the unexposed portion of said positive film the components carried by another negative film, so as to form a single composite scene on the positive film which includes components recorded on all of said negatives, then developing the positive and painting in spaces and discrepancies between components printed from said separate negatives on said positive, so as to correlate such components and form a unitary, composite scene therefrom.

Signed at Culver City, California, this 2nd day of December, 1927.

RAYMOND J. MAMMES.